March 14, 1933. F. W. BURGER 1,901,629
DUAL WHEEL
Filed Dec. 19, 1930 2 Sheets-Sheet 1

Inventor:
Frederick W. Burger
By Brown Jackson Boucher
Attys.

March 14, 1933. F. W. BURGER 1,901,629
DUAL WHEEL
Filed Dec. 19, 1930 2 Sheets-Sheet 2
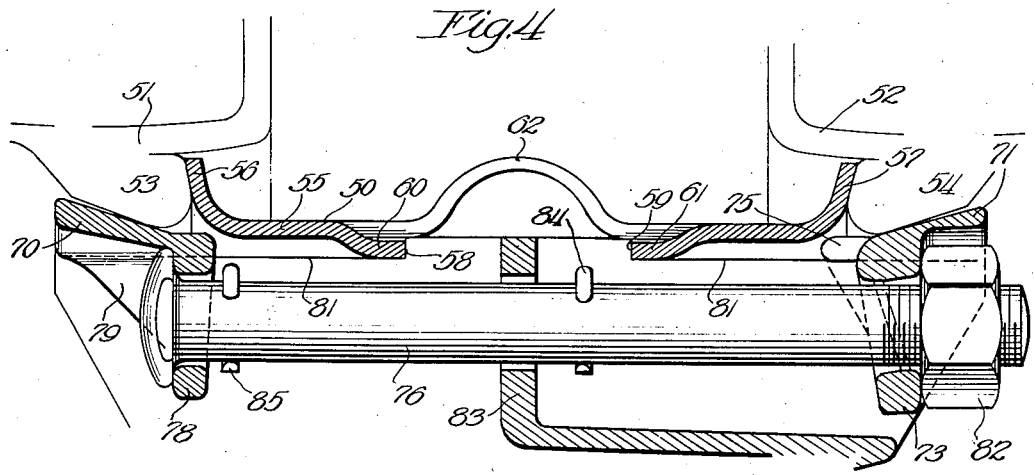
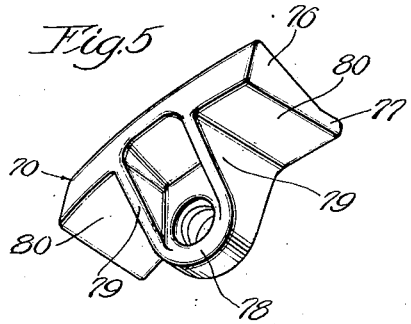
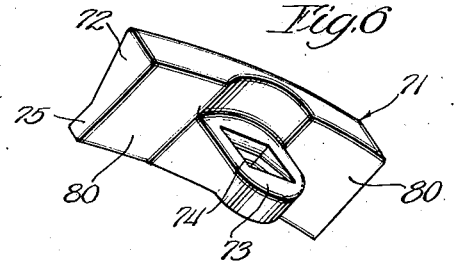
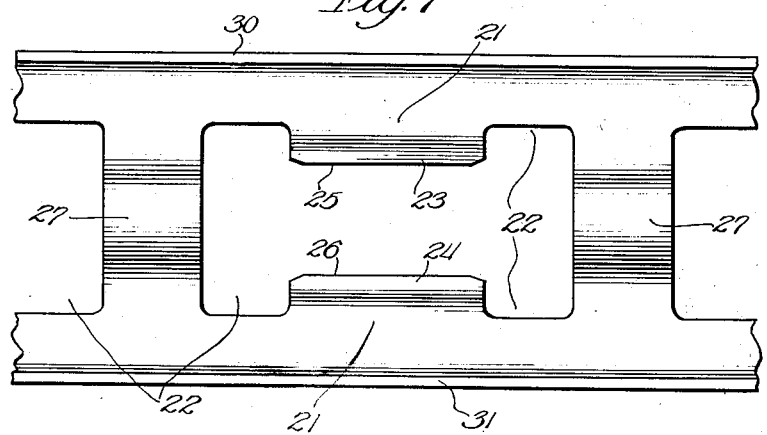
Inventor:
Frederick W. Burger
By Brown, Jackson, Boettcher & Dienner
Attys.

Patented Mar. 14, 1933

1,901,629

UNITED STATES PATENT OFFICE

FREDERICK W. BURGER, OF NILES, MICHIGAN, ASSIGNOR TO CLARK EQUIPMENT COMPANY OF BUCHANAN, MICHIGAN, A CORPORATION OF MICHIGAN

DUAL WHEEL

Application filed December 19, 1930. Serial No. 503,433.

This invention relates to dual wheels, such as those disclosed and claimed in my prior Patent No. 1,829,889, issued November 3, 1931, and in my copending application, Serial No. 198,035, filed June 11, 1927.

Felloeless dual wheels, which have a pair of rims mounted directly upon the ends of the spokes by clamping means engaging the gutters of the rims, are old in the art. In wheels of this kind, a spacing ring or spacing rings are employed to bear against the outside edge of the gutter of the inboard rim and the inside edge of the gutter of the outboard rim, these spacing rings cooperating with the clamping lugs to align the rims with respect to the wheel and to hold the rims securely upon the wheel.

When it is necessary to change a tire on a wheel of this kind, the bolts are loosened with the result that both the inboard and the outboard rims are loosened from the spoke ends, and if the inboard tire is to be changed, the outer or outboard rim and tire must be completely removed from the wheel in order to permit slipping the inboard rim over the spoke ends and off of the wheel. The spacing ring therefore must also be removable and it is customary practice to provide a solid outer spacing ring and a split inner spacing ring, the splitting of the inner ring being necessary to facilitate its removal from the wheel. In certain other instances a single spacing ring designed to align both the inboard and outboard rims with respect to the wheel has been used, this ring being a split ring held together either by a bolting or a clamping arrangement.

My present invention has for its principal object the provision of a new and improved spacing ring for aligning and spacing of the two rims of a dual wheel directly upon the ends of the felloeless spokes, this ring being free from clamping or locking devices which will obviously give trouble to the operator of the vehicle.

In the preferred embodiment of my invention, I provide a ring having a cylindrical web, from the ends or edges of which flanges are projected substantially radially. These flanges are shaped to give proper registration or contact with the edges of the gutters of the rims so that the latter may be securely fastened to the wheel. The web of the ring is provided with a plurality of substantially rectangular perforations into which are projected a pair of ears, these ears also extending radially inward of the ring, that is, out of the plane of the web toward the geometrical center thereof.

The end of each spoke is shouldered or otherwise formed with abutments and these ears are adapted to register or abut against these shoulders or abutments to properly align and hold the ring upon the wheel when the bolts are tightened.

The space between adjacent perforations in the web of the ring is arched outwardly midway between the two flanges of the ring so that the ring, when subjected to axial pressure, will yield somewhat and thereby permit the ears to securely seat themselves against the shouldered portion of the spoke. Because of this flexibility of the ring, an appreciable clearance can be left between the inner ends or edges of the ears and the shouldered portion of the spoke so that when the ring is placed on the wheel with the ears registering in the spaces between adjacent spokes, and then subsequently rotated to bring those ears on opposite sides of the shoulders or abutments of the spokes, the ears will not strike or bind against the shoulders and consequently this rotation can be easily accomplished.

Now to acquaint those skilled in the art with the teachings of my invention, reference is made to the accompanying drawings in which a preferred embodiment of it is shown by way of example and in which:

Figure 4 is a fragmentary cross sectional view taken along the median line of a spoke of a wheel similar to that shown in Figure 1, and showing a slightly modified embodiment of my invention;

Figure 5 is a perspective view of the clamping lug used in connection with the embodiment of my invention shown in Figure 4;

Figure 6 is a perspective view of the back side clamping lug used in the wheel of Figure 4; and Figure 7 is a fragmentary plan view of the spacing ring of my invention.

Figure 1:
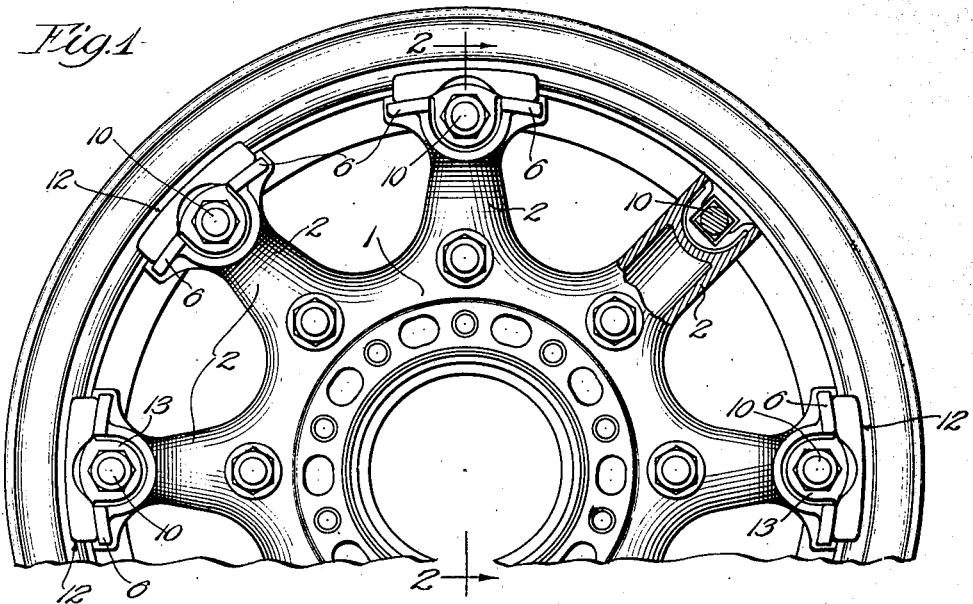
Figure 1 is a fragmentary elevational view of a wheel equipped with rims secured in accordance with the teachings of my invention.

Referring to the drawings now in more detail, the wheel upon which the dual rims are to be mounted, preferably consists of an integrally cast hub 1 having spokes 2 radiating therefrom and terminating in spoke ends, which contain shoulders and sockets, as will presently appear. Wheels of this kind are in common use in connection with heavy trucks, buses, and the like. While my invention is readily adapted to a wheel of this type, its use is not limited to such wheels as will be understood by those skilled in the art.

The free end of the spokes 2 contain an inboard socket 3 and an outboard socket 4 separated by an integral dividing wall 5 located substantially in the median or central plane of the wheel. The walls of the spokes adjacent the socket 4 are terminated in shouldered portions 6 which lie on a circle whose center coincides with the center of the hub 1, these shoulders being provided to form a seat for the outboard clamping lugs that secure the rim to the wheel. The walls 7 of the socket 3 of each spoke similarly terminates in seats to receive the inboard clamping lugs.

The walls 6 and 7 of the spoke ends are shouldered, as at 8, these shoulders being spaced equi-distantly from the dividing wall 5 and consequently from the median plane of the wheel to form centrally located and radially outwardly projecting abutments.

The dividing wall 5 is perforated to receive a through bolt 10 by which the inboard clamping lug 11 and the outboard clamping lug 12 are attached to the spoke. It will be seen in Figure 3, in which the inboard clamping lug 11 is shown in detail, this lug consists of a depending ear 13 which is perforated with a square hole 14 to receive the head of the bolt 10. The main body of the lug is arcuate in shape and surfaces 15 and 16 are shaped to bear against the seats formed by the shouldered side walls 7 of the socket 3. The radially outer surface of the clamping lug contains a cylindrical section 17 by which the rim is centered with respect to the wheel, in the manner which will hereinafter appear, and a tapered or crescent portion 18 by which the rim is clamped to the wheel.

The outboard clamping lug 12 is constructed similarly to the clamping lug 11 except that the perforation is round instead of square since the threaded portion of the bolt 10 is projected through it.

Figure 2:
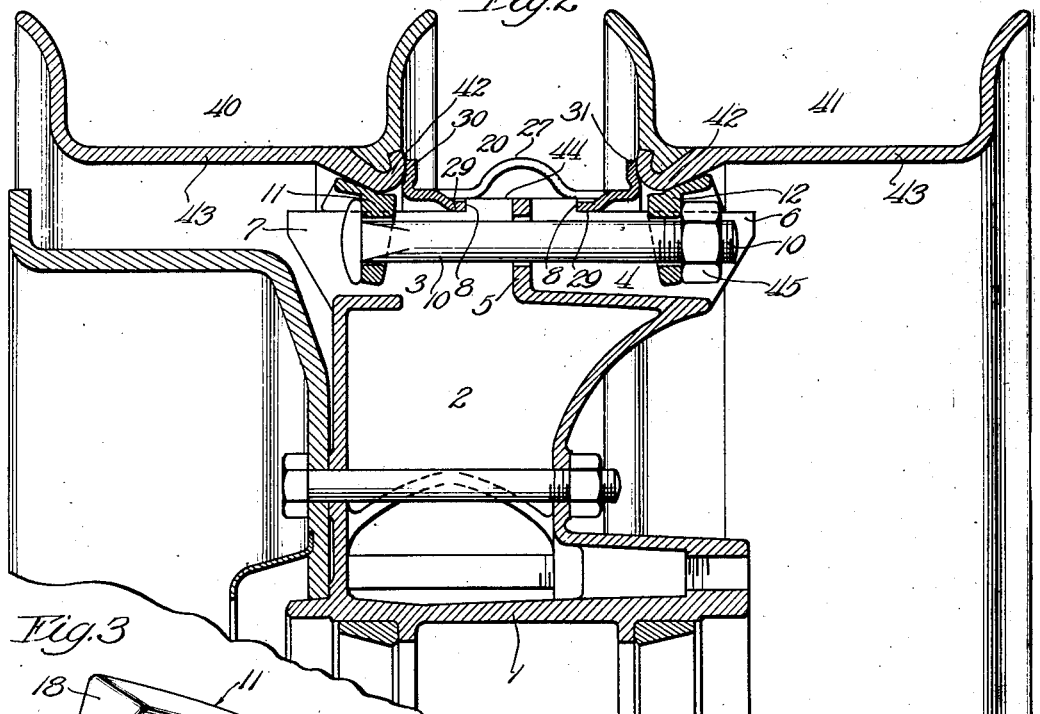
Figure 2 is a fragmentary cross sectional view taken along the line 2—2 of Figure 1, looking in the direction of the arrows.

The spacing ring 20, best seen in Figures 2 and 7, consists of a cylindrical web 21 which is perforated at spaced intervals by substantially rectangular perforations 22. A pair of depending ears or tangs 23 and 24 are projected laterally inwardly into each of the perforations 22, the ears being bent radially inwardly of the ring and out of the plane of the web 21, so that when the ring is placed in its position upon the wheel, the squared edges 25 and 26 of the ears 23 and 24, respectively, will securely seat themselves against the shoulders 8 on the side wall of the spoke.

The portions of the web intervening between the perforations 22 and 23 are arched as shown at 27 to give resiliency to the ring. These arches are extended outwardly of the ring, that is, away from the spoke of the wheel upon which it is to be mounted. This is equivalent, in effect, to two spacing rings interconnected by integral resilient sections.

The edges of the web 21 of the ring are formed as radially outwardly extending flanges 30 and 31, which flanges are shaped to receive and securely seat the gutters of the rims that are to be mounted upon the wheel.

In mounting the spacing ring 20 upon the wheel, it is shoved over the spokes with the radially inwardly depending ears or tangs 23 and 24 located in the space between adjacent spokes. After the ring 20 has been approximately centered upon the wheel, it is rotated with respect to the wheel to bring the ears or tangs 23 and 24 on opposite sides of the shouldered abutments 8 at the ends of the spokes. The ends of the squared edges 25 and 26 are flared circumferentially to facilitate the positioning of the ears 23 and 24, as will be apparent from Figure 7. The radially inwardly facing surfaces 29 of these ears are formed on a circle which is slightly greater in diameter than the circle upon which the outermost ends of the walls 6 and 7 of the spokes lie. The working surfaces or edges 25 and 26 of the ears or tangs do not register with the shoulders 8 at this time, that is, the distance between the edges 25 and 26 is greater than the distance between the shoulders 8, and both edges 25 and 26 do not contact therewith at this time. In one embodiment of my invention, a clearance of slightly more than one-eighth of an inch between the adjacent edges 25 and 26 of these ears and the outer faces of the shoulders 8 provides ample clearance so that the ring may be rotated with respect to the wheel without difficulty.

The rims 40 and 41 shown in Figures 1 and 2 are of the type in which the gutters 42, by which the rims are locked onto the wheel, are positioned at one edge of the cylindrical central web 43 of the rim. These figures illustrate but one of the types of rims with which my invention is adapted to work.

In the mounting of the rims shown in Figures 1 and 2 upon the wheel, the inboard rim 40 is slipped over the spoke ends and against the clamping wedges 11. The radially inner edge of the gutter 42 lies on a circle whose diameter is slightly greater than the diameter of the circle upon which the outermost ends 44 of the walls of the spokes are positioned so that this can be easily acomplished. The spacing ring 20 is next slipped over the spokes and rotated to bring the ears 23 and 24 into registration with the spoke ends. The outboard rim 31 is then slipped into place against the flange 31 on the spacing ring, and the clamping wedges 12 are then placed over the bolt 10, and nuts 45 are threaded in place to draw these wedges tightly against the gutter of the rim.

As the nut 45 is tightened, wedges 11 and 12 are made to approach each other, the gutter 42 of the rim 40 being pushed by engagement with cylindrical section 17 of the clamping member 11 to align the rim so that its axis coincides with the axis of the wheel. The radially innermost section of the gutter 42 of the rim 41 similarly engages the cylindrical section of the clamping lug 12 to center that rim upon the wheel. As the nut 45 is further tightened, the clamping surfaces 18 of the lugs 11 and 12 engage the tapered surfaces of the gutter 42 to draw the rims 41 and 40 toward each other. This causes the adjacent surfaces of the gutters to press against the flanges 30 and 31 on the spacing ring, and as tension is increased by further turning of the nut 45, the arched portions 27 of the clamping ring are sprung to permit the flanges 30 and 31 to approach each other. This brings the working surfaces or edges 25 and 26 of the ears 23 and 24, respectively, in abutting relation against the shoulders 8 on the spoke ends, the assembly locking tight when these ears are securely seated against the shoulders.

Since the clamping ring 20 is rigid and fixed except for the arched portion 27, when the ears 25 and 26 firmly engage the shoulders of the spoke, rims 40 and 41 will be located equi-distantly from the median plane of the wheel and in planes parallel to the median plane of the wheel. This aligns the rims 40 and 41 so that they run true with the wheel. The sloping surfaces 18 of the clamping lugs 11 and 12, through their engagement with the tapered surfaces of the gutter 42, align the rims 40 and 41 so that their axes accurately coincide with the axis of the wheel.

When it is necesary to dismount the rim from the wheel, the foregoing process is reversed.

In the embodiment of my invention shown in Figure 4, the spacing ring 50 is modified to permit it to be used in connection with rims 51 and 52, whose gutters 53 and 54, respectively, are disposed laterally inwardly of the edge of the webs of the rims. The web 55 of the clamping ring 50 is made longer so that the flanges 56 and 57 are disposed at a greater distance from the working surfaces 58 and 59 of the clamping ears 60 and 61. The distance between the outer surfaces of the flanges 56 and 57 and the working surfaces 58 and 59 of the ears is accurately maintained so that the rims 51 and 52 will be properly positioned upon the wheel when these working surfaces are tightly drawn against the shouldered spoke ends.

The ring 50 is also provided with the arched members 62, which permit flexing the ring slightly to bring the working surfaces 58 and 59 into proper registration with the shouldered ends of the spokes. Except for these slight changes in dimension, the ring 50 and its manner of operation is identical with that previously explained.

Figure 3:
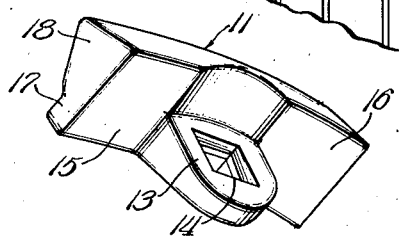
Figure 3 is a perspective view of the clamping lug employed in the wheel shown in Figure 1.

Clamping lugs 70 and 71 used to fasten rims of this type to the wheel, are constructed substantially the same as the lug shown in Figure 3 except that the inclined clamping portion 72 is longer to afford proper seating of the rim upon the lug. The depending ear 73 of the lug 70, through the square hole 74 of which the bolt is projected, is spaced back away from the cylindrical section 75 of the lug so that the bolt 76 employed may be of the same length as bolt 10. Similarly the lug 71 is constructed with a long clamping surface 76 adjacent its cylindrical aligning surface 77. Because of the width of the lugs 70 and 71, the ears 73 and 78 are provided with reinforcing members 79 which aid in securely holding the lugs against turning upon the bolt 76. These lugs are provided with surfaces 80 which seat upon the radially outer ends 81 of the sides of the spoke to prevent the lugs from turning when the nut 82 is tightened on the bolt 76. These shoulders 81 also form a rigid seat upon which the clamping lugs rest to resist radial thrusts placed upon the rims when the wheel is in service. The bolt 76 is locked in the dividing wall 83 of the spoke end by any desired arrangement such as the cotter key 84, and the lug 70 is similarly restricted in its movement on the bolt by a cotter key 85. The bolt 10 of Figure 2 may be similarly equipped if desired.

From the foregoing it will be apparent that the unitary spacing ring disclosed can be manipulated on and off of a felloeless wheel with less trouble than is encountered in manipulation of a pair of split rings or a unitary ring that is split and provided with locking or bolting arrangement to hold it together on the wheel. The arrangement of the inwardly depending ears which seat squarely against the shouldered ends of the spoke assure that the rims will be truly aligned with respect to the plane of the wheel, and the use of the particular clamping lug shown insures that the rims will also be properly aligned with their axes coinciding with the axis of the wheel. These lugs per se do not form an essential part of the instant invention, being more fully disclosed in my copending application, Serial No. 453,662, filed May 19, 1930 (case 10), to which application reference is here made for those details.

While I have shown my invention by illustrating a preferred embodiment of it, I have by way of example only and am not to be limited thereby as I am aware that there are many modifications and adaptations which can be made by one skilled in the art within the teachings of my invention.

Having thus complied with the statutes and shown and described a preferred embodiment of my invention, what I consider new and desire to have protected by Letters Patent is pointed out in the appended claims.

What is claimed is:

1. The combination of a felloeless wheel, a plurality of spokes in said wheel, a centrally disposed wall on the end of each spoke and in the plane of said wheel, a bolt projecting through each of said walls, a pair of wedges on each of said bolts, one on each side of the wall through which the bolt projects, a pair of rims having gutters against which said wedges press, and a single piece spacing ring engaging said rims and the ends of said spokes with portions on opposite sides of said walls to align the rims on said wheel.

2. The combination of a wheel having free end spokes, sockets at the free end of each of said spokes, a pair of rims having gutters, a spacing ring having opposite movably connected portions fitting over the ends of said spokes and abutting thereagainst, bolts extending through said spokes and disposed in said sockets and wedges pressed into engagement with said rim gutters by said bolts to clamp the rims against said spacing ring and said portions of the spacing ring against the spokes to thereby align them on said wheel.

3. The combination with a felloeless wheel having shouldered spoke ends upon which rims are mounted by bolts and wedges, of a spacing ring having flanged edges against which said rims abut, ears projecting radially inwardly from said ring and adapted to fit over said spoke ends as the ring is rotated about its axis to position it on the wheel, and arches in said ring adapted to permit said ring to collapse slightly under the tension of said bolts, wedges and rims to bring said ears against the shouldered ends of said spokes to thereby align said rims on said wheels.

4. The combination with a felloeless wheel having shouldered spoke ends upon which rims are mounted by bolts and wedges, of a yieldable spacing ring containing radially inwardly extending portions adapted to be positioned on opposite sides of said shouldered spoke ends, and intermediate arches connecting said portions and formed to yield under tension applied by said bolts through said wedges and rims to cause said portions to seat against said shouldered spokes to thereby align said rims on the wheel.

5. The combination with a felloeless wheel having shouldered spoke ends upon which rims are mounted by bolts and wedges, of a yieldable one piece spacing ring containing radially outwardly extending integral flanges shaped to register with said rims, radially inwardly extending integral ears shaped to fit over said spoke ends, and integral intermediate arches shaped to yield under tension applied by said bolts through said wedges, rims, and flanges to abut said ears against said shoulders to thereby align said rims on said wheels.

6. A spacing ring for felloeless dual wheels comprising a cylindrical web, flanges projecting substantially radially outwardly from the edges of said web, said flanges being shaped to engage adjacent rim margins, a plurality of yieldable arched sections extending radially outwardly from said web and midway between said flanges, and a plurality of pairs of ears projecting radially inwardly from said web.

7. A spacing ring for felloeless dual wheels comprising a cylindrical web having a plurality of substantially rectangular perforations, flanges projecting substantially radially outwardly from the edges of said web, yieldable radially outwardly projecting arches formed in said web between adjacent perforations, and two ears projecting radially inwardly of said web and into each of said perforations.

8. A spacing ring for felloeless dual wheels comprising a cylindrical web having a plurality of substantially rectangular perforations, flanges projecting substantially radially outwardly from the edges of said web, yieldable radially outwardly projecting arches formed in said web between adjacent perforations, and two ears projecting radially inwardly of said web and into each of said perforations, said ears terminating in straight true edges disposed normal to said web.

9. A wheel structure comprising a wheel body having peripherally disposed shouldered means acting as an abutment, two tire rims having an inside diameter greater than the diameter of the wheel body and said means so as to permit their being slipped thereover, spacing means between each rim and the shouldered abutment means and adapted to space each of the rims a fixed distance from the abutment, resilient means securing both of said spacing means together, and wedging means to draw the rims against the spacing means and the spacing means against the abutment.

10. A wheel structure comprising a wheel body having peripherally disposed means acting as an abutment and positioned substantially centrally of the wheel body, two rims having an inside diameter larger than the diameter of the wheel body so as to permit their being slipped thereover, a spacing ring between each rim and the central abutment, arched resilient sections joining said rings together, and means to draw the rims against the spacing rings and the spacing rings against the central abutment.

11. A wheel comprising a wheel body having a hub and spokes radiating therefrom, said spokes having seats at their outer ends and said wheel body being arranged to support separate tire carrying rims mounted on said seats at opposite sides of the wheel body, continuous spacing rings mounted on said seats between said rims, said seats carrying shouldered abutment means centrally of the wheel body, integral resilient sections connecting said spacing rings together, separate wedge means mounted on said spokes at opposite sides thereof and movable toward one another to engage said rims to draw the rims against the spacing rings and said spacing rings against said central abutment means to thereby secure the rims and rings on the wheel body.

12. A wheel comprising a wheel body having a hub and spokes radiating therefrom, the outer ends of said spokes having seats and shouldered abutment means, said wheel body being arranged to support separate tire carrying rims mounted on said seats at opposite sides thereof, spacing means adapted to be mounted on said seats between said rims, said spacing means having a diameter slightly in excess of said wheel body comprising a pair of rings shiftably interconnected for relative movement and provided with circumferentially spaced radially inwardly projecting lugs adapted to lie opposite said abutment means at the outer ends of said spokes after said spacing means have been mounted on said seats and rotated through an angular displacement, and means at the outer ends of said spokes for drawing said rims toward one another and against said spacing means, the lugs on said spacing means being clamped against said abutment means whereby the rims are aligned on the wheel body.

13. A wheel comprising a wheel body having a hub and spokes, the latter having seat and abutment means at their radially outer ends, said wheel body being arranged to support separate tire carrying rims mounted on said seats at opposite sides of the wheel body, means to space each rim from said abutment means, each of said spacing means comprising a continuous circular member having a diameter slightly in excess of the diameter of said wheel body and provided with radially inwardly projected circumferentially spaced lugs adapted, after said spacing means have been applied to the wheel body and rotated, to abut against said abutment means, resilient means connecting the circular members of both of said spacing means together, said resilient means normally maintaining said lugs farther apart than the width of said abutment means on said spokes, and clamping means mounted on said spokes at opposite sides thereof and movable inwardly with respect to each other to engage said tire carrying rims to draw said rims against said spacing means and said spacing means against said abutment means to secure said rims on the wheel body.

14. A wheel comprising, in combination, a wheel body, spaced rims carried by said body, circumferentially spaced radially outwardly extending projections in the central plane of the wheel body presenting oppositely facing shoulders, seats on either side thereof, spacing means between the shoulders on one side of said projections and the adjacent rim, spacing means between the shoulders at the other side of said projections and the other rim, means connecting said spacing means together for relative movement, and clamping means to draw the rims against the spacing means and the spacing means against the shoulders of said projections to secure said rims in proper position upon the wheel body.

15. A wheel comprising, in combination, a wheel body having shouldered spoke ends, spaced rims carried by said body, circumferentially spaced abutments on the wheel body and presenting oppositely facing shoulders, said rims being adapted to be disposed on the wheel body on opposite sides of said abutments, and spacing means for aligning the rims on the wheel body comprising a closed ring member providing hoop strength and carrying shoulders for engaging said abutments and said rims, respectively, in generally axial directions, said ring member being provided with circumferential interruptions to permit the ring member to pass over the spoke ends and to be rotated angularly to bring certain of said shoulders into position to engage the abutments on the wheel body, at least a portion of said ring member being collapsible axially to provide for said last named shoulders engaging said abutments.

16. A wheel comprising a wheel body having a hub and spokes, means at the ends of said spokes forming axially facing shoulders, a pair of tire carrying rims adapted to be disposed on the wheel body, one on each side of said axially facing shoulders, spacing means in the form of a pair of interconnected members relatively movable axially of the wheel and adapted to be positioned between said shoulders and the adjacent edges of the rims, and means for clamping the rims against said members and said members against said shoulders, whereby the rims are positively aligned with respect to the plane of the wheel.

17. A wheel structure comprising a felloeless wheel body having shoulderd spoke ends adapted to receive rims on opposite sides thereof, spacing means for aligning the rims on said wheel body, said spacing means comprising portions facing inwardly and outwardly with respect to the central plane of the wheel and relatively movable in a direction axial with respect to the wheel, said outwardly facing portions being adapted to contact with the adjacent margins of said rims and the inwardly facing portions being adapted to contact with the shouldered portions of said spoke ends, the distance between said inwardly facing shoulders of the spacing means being greater than the width in an axial direction of the shouldered portions of said spoke ends, and clamping means for forcing the rims against said outwardly facing shoulders and compressing said spacing means to clamp said inwardly facing shoulders against said shouldered spoke ends, thereby securing said rims on said wheel body in proper aligned position.

18. An axially compressible ring having substantially incompressible portions along its sides adapted to form struts between the rims of dual tires and projecting spoke ends, said struts being circumferentially spaced to permit the same to be brought out of registration with the spoke ends by rotation of the ring.

19. A spacing ring for a dual rimmed wheel, said ring having marginal shouldered portions which are movable relatively towards and from one another and adapted to form struts between the rims of a wheel and peripheral portions of the latter when the rims are clamped thereon.

20. The combination of a wheel having free end spokes, sockets at the free end of each of said spokes, a pair of rims having gutters, spacing means having oppositely movable connected portions fitting over the ends of said spokes and abutting thereagainst, bolts extending through said spokes and disposed in said sockets and wedges pressed into engagement with said rim gutters by said bolts to clamp the rims against said spacing means and said portion of the spacing means against the spokes to thereby align them on said wheel.

21. The combination with a felloeless wheel having shouldered spoke ends upon which rims are mounted by bolt means and wedges, of a spacing member having flanged edges against which said rims abut, tangs extending laterally inwardly from said flanged edges and adapted to fit over at least one of said spoke ends, and arches in said member adapted to permit said member to collapse slightly under the tension of said bolt means, wedges and rims to bring said tangs against the shouldered end of said spoke to thereby align said rims on said wheel.

22. The combination with a felloeless wheel having shouldered spoke ends upon which rims are mounted by bolts and wedges, of a yieldable spacing means containing portions adapted to be positioned on opposite sides of said shouldered spoke ends, and intermediate arches connecting said portions and formed to yield under tension applied by said bolts through said wedges and rims to cause said portions to seat against said shouldered spokes to thereby align said rims on the wheel.

23. A spacing member for felloeless dual wheels comprising an arcuate web, flanges projecting substantially radially outwardly from the edges of said web, said flanges being shaped to engage adjacent rim margins, a plurality of yieldable arched sections carried by said web between said flanges, and oppositely disposed tangs carried by said web.

24. A spacing ring for felloeless dual wheels comprising a cylindrical web, flanges projecting substantially radially outwardly from the edges of said web, said flanges being shaped to engage adjacent rim margins, a plurality of yieldable arched sections carried by said web between said flanges, and oppositely disposed tangs carried by said web.

25. A spacing ring for felloeless dual wheels comprising a cylindrical web having a plurality of substantially rectangular perforations, flanges projecting substantially radially outwardly from the edges of said web, a yieldable section formed in said web between adjacent perforations, and tangs on the web projecting into each of said perforations.

26. The combination with a felloeless wheel having shouldered spoke ends upon which rims are mounted by clamping means reacting against the rims, of a spacer member adapted to be seated on each of said spoke ends and comprising a pair of relatively movable sections having flanges along the laterally outer edges of said sections adapted to register with said rims, said sections also having tangs adapted to be disposed at opposite sides of the shoulders of said spoke ends, and resilient means connecting said sections and arranged to normally maintain the laterally inner edges of said tangs farther apart than the width of said shoulders to permit the application of said spacer member and to permit the tangs to move into contact with said shoulder when said clamping means is tightened.

27. A spacing member for a dual rimmed wheel, said member having marginal shouldered portions which are movable towards and from one another and adapted to form abutment sections between the rims of a wheel and peripheral portions of the latter when the rims are clamped thereon.

28. The combination with a dual rimmed wheel having shouldered abutments between the rims, of clamping means for mounting said rims, a spacing member having relatively movable flanged sections against the flanges of which said rims are adapted to abut, tangs extending laterally inwardly from said flanged section and adapted to fit against said shouldered abutments, means connecting said sections and adapted to permit said member to collapse slightly under the tension of said clamping means to bring said tangs against the shouldered abutments to thereby accurately align said rims on said wheel.

29. A spacing member for dual wheels comprising an arcuate web having relatively movable sections, rim engaging means carried by said sections, at least one yieldable portion connecting said sections, and oppositely disposed tangs carried by said web near the adjacent edges of said sections.

In witness whereof, I hereunto subscribe my name this 15th day of December 1930.

FREDERICK W. BURGER.